MONITOR SYSTEM INSENSITIVE TO IMPEDANCE VARIATIONS

Filed Dec. 31, 1947 2 Sheets-Sheet 1

INVENTOR
D. K. GANNETT
BY
Walter M. Hill
ATTORNEY

MONITOR SYSTEM INSENSITIVE TO IMPEDANCE VARIATIONS

Filed Dec. 31, 1947 2 Sheets-Sheet 2

$$E = G_1\left(E_1 - \frac{G_2}{G_1}E_2\right)$$

$$k = \frac{G_2}{G_1}$$

$$E = \frac{G_1}{2}\left(E_1 - \frac{G_2}{G_1}E_2\right)$$

$$k = \frac{G_2}{G_1}$$

INVENTOR
D. K. GANNETT
BY
Walter M. Hill
ATTORNEY

Patented May 26, 1953 2,640,094

UNITED STATES PATENT OFFICE 2,640,094

MONITOR SYSTEM INSENSITIVE TO IMPEDANCE VARIATIONS

Danforth K. Gannett, Mountain Lakes, N. J., assignor to Bell Telephone Laboratories, Incorporated, New York, N. Y., a corporation of New York Application December 31, 1947, Serial No. 794,877

9 Claims. (Cl. 171—95)

This invention relates to a monitoring system for monitoring the output of a television studio, television line, or other source of high frequency signals.

It is of particular interest to the television broadcaster to be able to monitor his outgoing video signals at the point where they are fed into an outgoing transmission line or other circuit in order that he may check the proper functioning of his equipment up to that point. Merely bridging a television monitor or oscilloscope at this point may, however, give distorted signals unless the line impedance matches the output impedance of the studio equipment. In order to enable the broadcaster to isolate circuit difficulties quickly it is very advantageous to have the response of the monitoring indicator entirely independent of the value of the line impedance, including even an open circuit when no line is connected, as well as independent of any voltages originating in the line including reflected waves due to mismatch or other circuit discontinuities.

It is, therefore, the object of this invention to provide a monitoring system for monitoring the signal voltage of a transmitter feeding into a transmission line or other circuit, the indications of which are entirely independent of the impedance of such transmission line or circuit and also independent of any voltages originating therein. A secondary object is to accomplish this with only a very small loss to the transmitted signal.

The foregoing objects are achieved by this invention which provides in combination a fixed value two-terminal impedance of the same phase angle as that of the transmitter output impedance and connections inserting this two-terminal impedance in series with a transmission path interconnecting the transmitter to its load circuit, whereby a first shunt voltage exists across the transmission path on the transmitter side of said inserted impedance and a second shunt voltage exists across the transmission path on the load side. A voltage subtraction circuit is coupled to this transmission path on both sides of the inserted impedance whereby a difference voltage is derived proportional to the difference between said first shunt voltage and a fractional part of said second shunt voltage. An indicating means, such as a conventional television monitor or oscilloscope, is connected through an amplifier to said subtraction circuit to observe this difference voltage which is proportional to the transmitter signal voltage.

The invention may be better understood by referring to the accompanying drawings in which.

Figures 1, 2, 3:
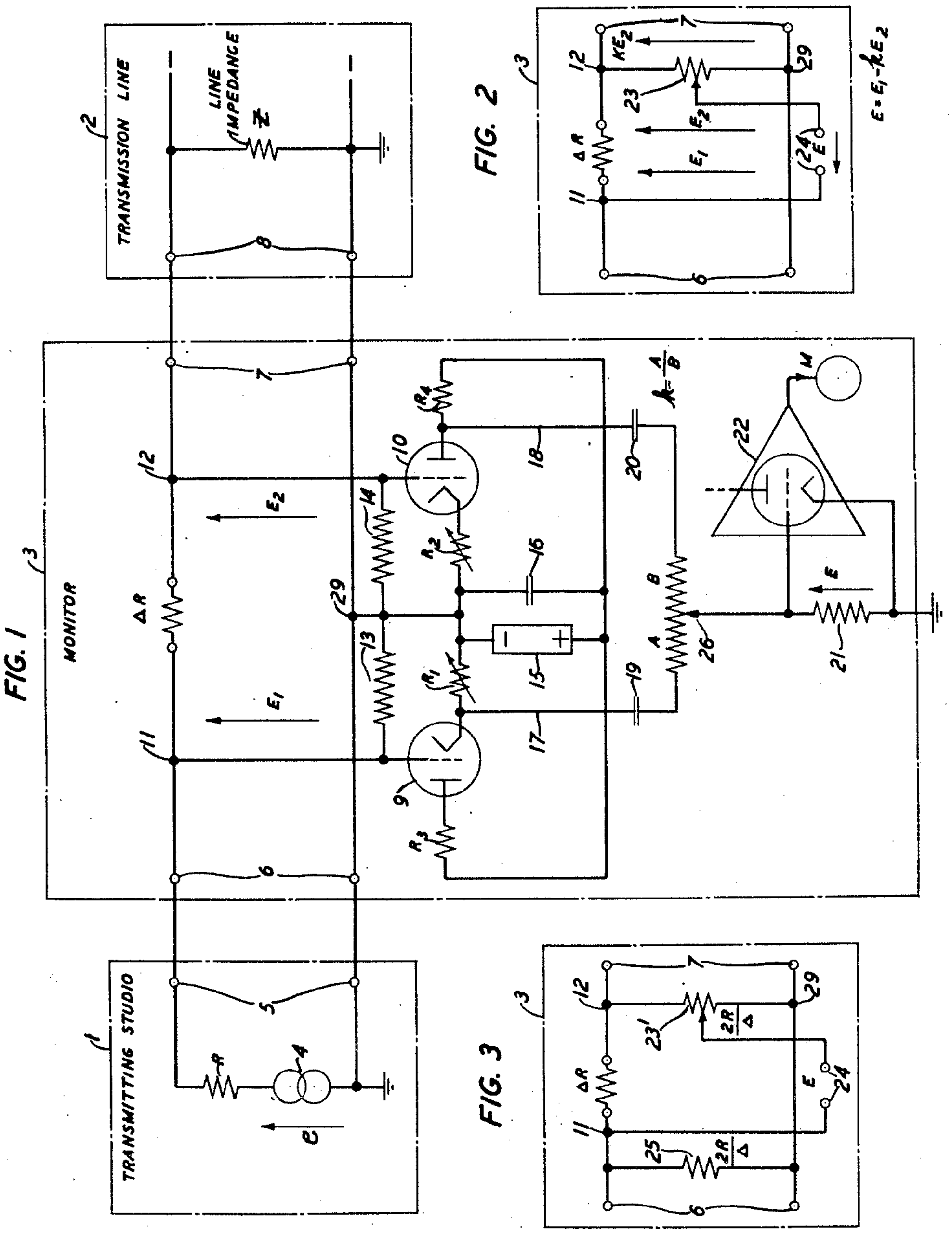
Fig. 1 shows a preferred embodiment of this invention.
Fig. 2 is a simplified elementary sketch illustrating the principles of the invention but nevertheless embodying circuits capable of performing, at least at lower frequencies.
Fig. 3 is similar to Fig. 2 except that it includes a pair of shunt impedances to match the impedance of the transmitter and line.

Referring now more particularly to Fig. 1 it will be noted that a transmitting studio 1 is feeding signals into a transmission line 2. While a transmission line has been shown, it is obvious that any kind of load circuit may be substituted for it. In the transmission path between the studio and the line will be found a monitor circuit 3 with input terminals 6 connected to the output terminals 5 of the transmitting studio and output terminals 7 connected to the input terminals 8 of the transmission line. The generator in the transmitting studio 1 is shown as an alternating current source 4 of electromotive force $e$ feeding through an output impedance R. Electromotive force $e$ may have a complex wave shape such as a television video signal. The transmission line is assumed to have an impedance Z. While impedances R and Z are preferably pure resistances, it is unnecessary, in so far as this invention is concerned, that they be so.

It is desired that the monitor circuit be so connected to this transmission system that it will at all times indicate the wave shape and amplitude of the transmitting voltage $e$ independently of the actual impedance Z of the line or of any voltages which may originate in the transmission line, such as reflected voltages due to an actual mismatch. When this is accomplished it is evident, as will be shown later, that the indication of the monitor circuit will be the same irrespective of whether or not the line is short-circuited, open-circuited or has any other impedance or phase angle with respect to the impedance of the transmitting station. The monitor will also be altogether unresponsive to any voltages originating in the transmission line.

In accordance with this invention a small impedance $\Delta R$ is inserted in series with the transmission path connecting the transmitter to the line. In this symbol the letter $\Delta$ signifies a pure number fraction and the letter R symbolizes an impedance of the same magnitude and phase angle as that of the transmitting studio output impedance. In practice, R is usually a pure resistance, and ΔR would therefore also be a resistance. Any mismatch caused by the introduction of this small impedance may be compensated for by reducing the transmitter impedance by the same amount or, in the alternative, the shunt network of Fig. 3 may be employed as will be more fully described later.

The introduction of the small impedance ΔR in the transmission path provides two shunt voltages $E_1$ and $E_2$ shown across the transmission path on either side of the inserted impedance ΔR. The first of these shunt voltages $E_1$ is across the path on the transmitter side of the inserted impedance ΔR, while the second shunt voltage $E_2$ is across the transmission path on the line side of the inserted impedance. It has been discovered that if a difference voltage is obtained which is proportional to the difference between voltage $E_1$ and a definite fractional part of voltage $E_2$, this difference voltage will be proportional to the transmitter signal voltage $e$ and entirely independent of variations in line impedance Z, as well as independent of any voltages originating in the line. This can be more easily understood by first referring to Fig. 2.

In Fig. 2 a simplified circuit embodying the principles of the monitor 3 of Fig. 1 is shown. Here it will be noted that the portion of the transmission path between terminals 6 and 7 includes a series impedance ΔR with shunt voltages $E_1$ and $E_2$ on either side thereof. In order to obtain the difference voltage mentioned in the preceding paragraph, a voltage subtraction circuit is shown in Fig. 2 connected at junctions 11, 12 and 29. Across the transmission path on the line or load side is connected a potentiometer 23 between junctions 12 and 29. This potentiometer is of relatively high resistance so as to introduce no substantial insertion loss. It is evident that the potential between the junctions 12 and 29 will be voltage $E_2$ and that the slider of potentiometer 23 may select any fractional part $kE_2$ of this voltage. In this figure terminals 24 may be designated the monitor terminals at which point the difference voltage is observed. This voltage, by reason of the connection of one of these terminals to junction 11 and the other terminal to the slider of potentiometer 23, will be the difference between voltages $E_1$ and $kE_2$, that is, $$E=E_1-kE_2 \qquad (1)$$

In Equation 1, as well as elsewhere in this specification, the factor $k$ is to be regarded as a pure fractional number less than unity.

If it is assumed that the monitor circuit of Fig. 2 is connected in Fig. 1 in place of the monitor 3 shown in Fig. 1 and if a high input impedance vacuum tube voltmeter be connected across terminals 24 to measure the difference voltage existing thereacross it will be found that there is a position of the potentiometer slider of potentiometer 23 where the voltage indication of the vacuum tube voltmeter will be unaffected by shorting or opening terminals 7 on the line side. It will also be observed that this same adjustment of the slider will render the vacuum tube voltmeter indication insensitive to any voltages applied to terminals 7. The indication, however, can be shown to be proportional to the signal voltage $e$ of the transmitter. The following simple considerations of the circuit of Fig. 2 will demonstrate the principle involved.

With the monitor circuit 3 of Fig. 2 inserted in place of the monitor 3 of Fig. 1 the voltage $E_1$ may be written $$E_1=\frac{(\Delta R+Z)e}{R+\Delta R+Z} \qquad (2)$$

Also the voltage $E_2$ may be written as $$E_2=\frac{Ze}{R+\Delta R+Z} \qquad (3)$$

In each of the above expressions the various impedances and voltages are those shown on the drawing. The difference or monitoring voltage E is therefore the difference between $E_1$ and $kE_2$ as defined in Equation 1 above and is $$E=\frac{[\Delta R+Z(1-k)]e}{R(1+\Delta)+Z} \qquad (4)$$

If the fraction $k$ is proportioned as shown in the following expression it will be found that the difference or monitoring voltage E will be independent of the line impedance Z.

$$k=\frac{1}{1+\Delta} \qquad (5)$$

Making the substitution of this value of $k$ in Equation 4 will result in the following expression $$E=\left(\frac{\Delta}{1+\Delta}\right)e \qquad (6)$$

Since Δ is a pure fractional number it is evident that the monitoring voltage E is proportional to the transmitter signal voltage $e$ and entirely independent of the line impedance. If it be assumed that a voltage originates in the line side and a similar mathematical analysis be made, it will be found that the difference voltage E will be zero, thus indicating that when the fraction $k$ is proportioned as indicated in Equation 5, the line and monitor circuit are conjugate in the sense that voltages originating in the line, such as, for example, reflected voltages do not affect the indication of the monitor. It will be noted that this result is obtained with very little reduction of the amplitude of the signal transmitted to the line. The through loss is only the insertion loss of the resistance ΔR, and by making Δ small, can be reduced to a very small value.

In higher frequency circuits as, for example, in television, it is preferred to use the coupling arrangement for the monitor circuit as shown in Fig. 1. In this case the voltage subtraction circuit is connected as before at junction points 11, 12 and 29 and the two shunt voltages $E_1$ and $E_2$ are applied to the grids of vacuum tubes 9 and 10, respectively. If a direct current path exists in either the transmitter or the line the grid resistors 13 and 14 may be eliminated. If not, at least one of them must be included. This resistance, however, is relatively high compared with the impedance of the line. Amplifier 9 has a cathode resistor $R_1$ and an anode resistor $R_3$, while amplifier 10 has a cathode resistor $R_2$ and an anode resistor $R_4$. The plate supply voltage is obtained from a regulated power supply 15 bypassed by a capacitor 16. In amplifier 9, resistors $R_1$ and $R_3$ have values which are approximately the same, and larger than the internal plate-to-cathode resistance of the tube. This makes the amplifier a conventional cathode-follower type of circuit of well-known properties. In such circuits the voltage across the cathode resistor is, to a first order approximation, equal to the voltage applied to the grid, and substantially independent of the vacuum tube characteristics. The voltage across the anode resistor is equal to that across the cathode resistor multiplied by the ratio of the resistances, but of opposite phase. Voltages of either polarity can thus be obtained, whose relative values depend only on the resistances and whose absolute values are substantially independent of the tube. Amplifier 10 is identical with amplifier 9. Therefore by utilizing the voltage drop across the cathode resistor of amplifier 9 and across the anode resistor of amplifier 10, stable voltages of opposite phase are derived, the addition of which is equivalent to subtraction of the voltages applied to the grids. The voltages are added by transmitting them through blocking condensers 19 and 20 to a voltage addition circuit comprising resistors A, B, and 21. Resistors A and B may be combined in the form of a potentiometer with a slider 26 so as to permit adjusting their relative values.

As noted before, it is desired to subtract a fraction $k$ of $E_2$ from $E_1$. This fraction may be obtained by making $R_4=kR_2$, $R_3=kR_1$, and $A=B$, or by making $R_1=R_2=R_3=R_4$ and $A=kB$, or by other well-known means. In any case, the monitoring voltage E appearing across resistor 21 will be proportional to the difference between the two shunt voltages as defined by Equation 1 above. The drawing shows this voltage applied to an amplifier 22 whose output is connected to the television monitor, oscilloscope or other monitoring device M. Equation 6 showed there to be a voltage loss in the monitoring circuits described corresponding to the ratio $$\frac{\Delta}{1+\Delta}$$

The purpose of amplifier 22 is to compensate for this loss and to amplify the signal to a suitable level for application to the monitor. It should be understood that the monitor indicator M may be a conventional television receiver, a conventional cathode ray oscilloscope, a vacuum tube voltmeter or any desired combination thereof. In television practice, for example, it is customary to employ both the television receiver and the oscilloscope, the former showing the transmitted picture and the latter the wave form and amplitude of the transmitted signal voltage. One such arrangement especially devised for this purpose is disclosed in United States Patent 2,391,090, granted December 18, 1945, to Thomas T. Goldsmith, Jr. Others, of course, are well known in the television art.

As already stated, the output impedance R of the transmitting studio 1 may, if desired, be slightly changed in order to avoid reflection caused by the introduction of the small impedance $\Delta$R, by reducing R by the amount $\Delta$R. Another way of avoiding undesired reflections would be to introduce two shunt resistors of value $2R/\Delta$ as shown in Fig. 3. When this is done the insertion loss expressed in decibels is doubled but the impedance facing the transmission line is the same as though the monitoring circuit were not used. When this is done as shown in Fig. 3, the shunt impedance 23′ on the line side of the small inserted impedance $\Delta$R may take the place of the potentiometer 23 of Fig. 2 and the operation of the circuit is otherwise identical with that previously described for Fig. 2. The other shunt impedance 25, also of value $2R/\Delta$, merely completes the insertion network so that the impedance at terminals 6 and 7 will be the same and equal to the impedance of the transmitter 1. In the case of Fig. 1, resistors 13 and 14 may be given the proper values to correspond to resistors 25 and 23′ of Fig. 3.

Figure 4:
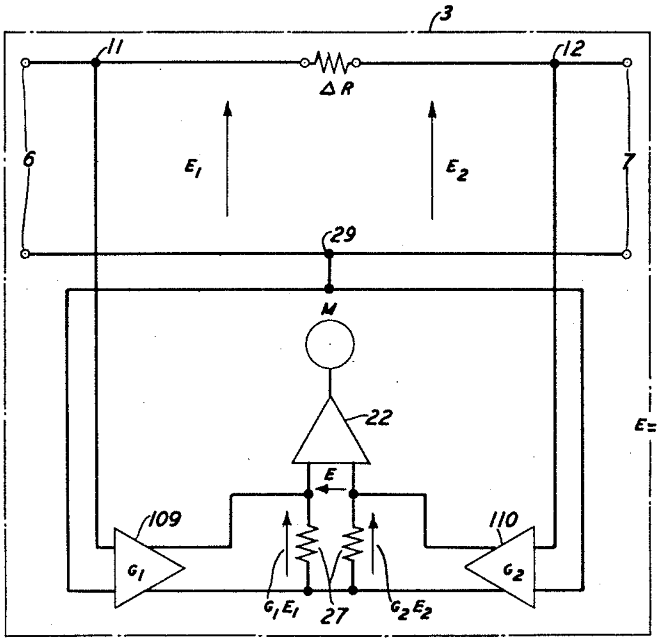
Figs. 4 and 5 disclose other well-known types of voltage subtraction circuits which may be substituted for the preferred form shown in the monitor circuit of Fig. 1.
Figure 5:
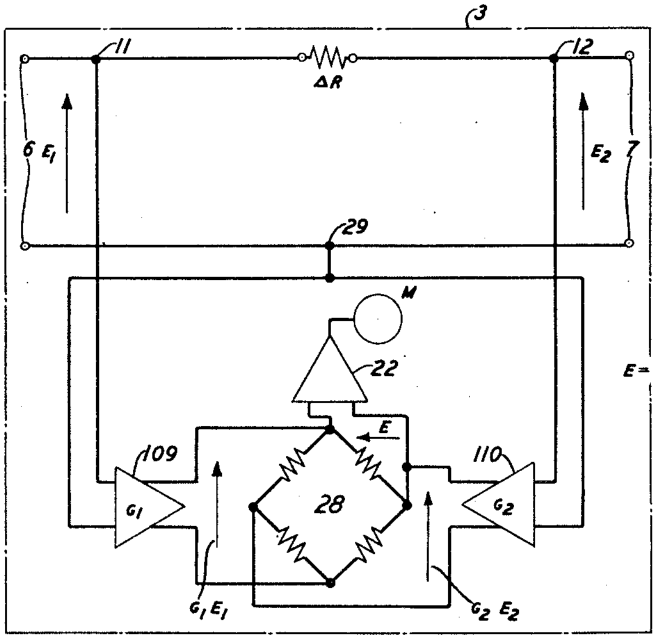

While the subtraction circuit of the monitor 3 of Fig. 1 is preferred for high frequency transmission networks as, for example, video circuits in television broadcasting, the circuits of Figs. 4 and 5 provide the same functions. In these figures, the parts which correspond with those in Figs. 1, 2 and 3 bear the same reference characters.

In Fig. 4, for example, the subtraction network is connected to the junction points 11, 12 and 29 in just the same manner as previously described for Figs. 1 and 2. The amplifiers 109 and 110 correspond with amplifiers 9 and 10 of Fig. 1, but in this case are generalized in that they may be of any convenient type. Their voltage gains may be represented by the letters $G_1$ and $G_2$ so that the output voltages across subtraction resistors 27 will, respectively, have the magnitude and phase indicated in Fig. 4. By applying an analysis to this circuit similar to the one already applied to Fig. 2, it will be noted that the monitoring voltage E will be independent of line or load impedance connected to terminals 7 or independent of any voltages originating therein providing the ratio of the amplifier gains $G_2$ to $G_1$ is equal to the fraction $k$ as defined by Equation 5.

In Fig. 5 the same relationship obtains as in Fig. 4. This circuit, however, differs from Fig. 4 in that a different subtraction network of resistors 28 are employed. In this case this network comprises four, preferably equal, resistors with connections to the outputs of the amplifiers 109 and 110 as indicated. It is well known that the voltage across one of the arms of such a network will be proportional to the difference between the voltages applied to the two diagonals. This difference voltage is the monitoring voltage E which is observed by the monitoring device as already described.

While a mathematical analysis of the circuit operation has been presented it must be understood that, because of constructional inaccuracies and spurious admittances, particularly at high frequencies, this exact relationship is not always ideally realized. Nevertheless, it is a close approximation and can easily be realized in a practical way by simply adjusting the elements controlling the fraction $k$ until no change in indication is observed when terminals 7 are alternately short-circuited and open-circuited. For example, in Fig. 1 slider 26 is so adjusted until this condition is obtained. Again in Figs. 2 and 3 the sliders of the potentiometers 23 and 23′, respectively, are adjusted for this purpose. Then in Figs. 4 and 5 this adjustment is made by simply adjusting the relative gains of the two amplifiers 109 and 110. In each case, if it is desired that a particular value of studio voltage $e$ give a particular indication on the monitoring device M, the gain of the amplifier 22 may be adjusted during calibration until that value is observed.

What is claimed is:

1. A monitoring system for monitoring the signal voltage of a transmitter independent of the impedance of a load circuit to which it may be connected comprising a transmission path of two conductors for interconnecting the transmitter and the load circuit, an impedance having two terminals inserted in series with one of the conductors in said transmission path, the impedance of which is equal to a simple numerical fractional part of the transmitter output impedance, whereby a first shunt voltage exists across the transmission path on the transmitter side of said inserted impedance and a second shunt voltage exists across the transmission path on the load side, a voltage subtraction circuit comprising a voltage dividing means connected across the load side of the transmission path to derive a voltage equal to a fractional part of said second shunt voltage and also a circuit connecting said derived voltage in phase opposition to said first shunt voltage to derive a voltage equal to their difference, and an indicating means connected to said subtraction circuit for observing this difference voltage.

2. A monitoring system for monitoring the signal voltage of a transmitter independent of the impedance of a load circuit to which it may be connected comprising a transmission path of two conductors for interconnecting the transmitter and the load circuit, an impedance having two terminals inserted in series with one of the conductors in said transmission path, the impedance of which is equal to a simple numerical fractional part of the transmitter output impedance, whereby a first shunt voltage exists across the transmission path on the transmitter side of said inserted impedance and a second shunt voltage exists across the transmission path on the load side, a voltage subtraction circuit comprising a pair of vacuum tube amplifiers each having an input and an output circuit, a circuit connecting one of the input circuits to the transmission path on the transmitter side of said inserted impedance to receive said first shunt voltage, another circuit similarly connecting the other input circuit to the load side to receive said second shunt voltage, an impedance network connected to both of the output circuits to derive therefrom a difference voltage proportional to the difference between said first shunt voltage and a fractional part of said second shunt voltage, and an indicating means connected to said subtraction circuit for observing this difference voltage.

3. The combination in accordance with claim 2 wherein said impedance network comprises two series-connected resistors and a third resistor connected to the junction between them to form a star network and wherein one of said output circuits is connected to the free terminal of one of said two resistors and the free terminal of the third resistor, and the other output circuit is connected to the remaining free terminal and also to said free terminal of the third resistor whereby said difference voltage appears across said third resistor.

4. The combination in accordance with claim 2 wherein said impedance network comprises two series-connected resistors and a third resistor connected to the junction between them to form a star network and wherein one of said output circuits is connected to the free terminal of one of said two resistors and the free terminal of the third resistor, and the other output circuit is connected to the remaining free terminal and also to said free terminal of the third resistor whereby said difference voltage appears across said third resistor, and means for adjusting the relative resistance values of said two series-connected resistors.

5. The combination in accordance with claim 2 wherein said impedance network comprises two series-connected resistors and wherein one of the outputs is connected across one of said resistors and the other output is connected across the other resistor so that the output voltages are in opposed phase, whereby said difference voltage appears across said two series-connected resistors.

6. The combination in accordance with claim 2 wherein said impedance network comprises two series-connected resistors and wherein one of the outputs is connected across one of said resistors and the other output is connected across the other resistor so that the output voltages are in opposed phase, whereby said difference voltage appears across said two series-connected resistors, and means for adjusting the relative voltage gain values of said two amplifiers.

7. The combination in accordance with claim 2 wherein said impedance network comprises a bridge of four equal impedance arms with four terminals and wherein one of said outputs is connected across one pair of diagonal terminals of said bridge and the other output is connected across the conjugate diagonal terminals, whereby said difference voltage appears across an arm of the bridge.

8. The combination in accordance with claim 2 wherein said impedance network comprises a bridge of four equal impedance arms with four terminals and wherein one of said outputs is connected across one pair of diagonal terminals of said bridge and the other output is connected across the conjugate diagonal terminals, whereby said difference voltage appears across an arm of the bridge, and means for adjusting the relative voltage gain values of said two amplifiers.

9. Means for connecting a monitoring device into the transmission path at the junction between one high frequency line and a second such line in such a way that it is responsive only to voltages in the first of said lines, said means comprising an impedance with terminals for connection in series between the two lines, electronic amplifier circuits for connecting the two lines to the monitoring device, said circuits including means for applying to the monitoring device a voltage proportional to the difference between the voltage across the first line and a fractional part of the voltage across the second line, said fraction being equal to the reciprocal of the sum of unity and the ratio of said series impedance to the impedance of the first line.

DANFORTH K. GANNETT.

References Cited in the file of this patent

UNITED STATES PATENTS

| Number | Name | Date |
|---|---|---|
| 1,755,244 | Dietze | Apr. 22, 1930 |
| 2,118,471 | Monk | May 24, 1938 |
| 2,244,369 | Martin | June 3, 1941 |
| 2,275,401 | Norgaard | Mar. 3, 1942 |
| 2,305,952 | Cravath | Dec. 22, 1942 |
| 2,366,358 | Schlesinger | June 2, 1945 |
| 2,434,904 | Busignies | Jan. 27, 1948 |
| 2,495,390 | Shimek | Jan. 24, 1950 |
| 2,502,822 | Burton | Apr. 4, 1950 |